(12) United States Patent
Vollmering (10) Patent No.: US 10,787,108 B2
(45) Date of Patent: Sep. 29, 2020

(54) TRAILER BED MOUNTED LOAD PLOW SYSTEM

(71) Applicant: Mark Chris Vollmering, Riviera, TX (US)

(72) Inventor: Mark Chris Vollmering, Riviera, TX (US)

(*) Notice: Subject to any disclaimer, the term of this patent is extended or adjusted under 35 U.S.C. 154(b) by 0 days.

(21) Appl. No.: 16/789,407

(22) Filed: Feb. 12, 2020

(65) Prior Publication Data

US 2020/0180492 A1 Jun. 11, 2020

Related U.S. Application Data

(63) Continuation-in-part of application No. 16/024,330, filed on Jun. 29, 2018, now abandoned.

(51) Int. Cl.
*B60P 1/00* (2006.01)
*B60P 1/36* (2006.01)
*B65G 67/24* (2006.01)

(52) U.S. Cl.
CPC .............. *B60P 1/365* (2013.01); *B65G 67/24* (2013.01)

(58) Field of Classification Search
CPC ................................ B60P 1/006; B60P 1/365
USPC .................................................. 414/514, 515
See application file for complete search history.

(56) References Cited

U.S. PATENT DOCUMENTS

| | | | | |
|---|---|---|---|---|
| 3,656,638 A | * | 4/1972 | Hutton | A01D 90/105 414/518 |
| RE28,980 E | * | 9/1976 | Mackenzie | B60P 1/006 414/325 |
| 4,067,501 A | * | 1/1978 | Tate | A01C 3/066 239/672 |
| 4,685,856 A | * | 8/1987 | Hesse, Jr. | B60P 1/006 198/746 |
| 4,842,471 A | * | 6/1989 | Hodgetts | B60P 1/365 414/514 |
| 5,046,690 A | * | 9/1991 | Nordstrom | B64C 1/22 198/750.1 |
| 5,156,518 A | * | 10/1992 | VanMatre | B60P 1/006 414/507 |
| 5,997,233 A | * | 12/1999 | Whatley | A01D 90/10 414/25 |
| 8,662,598 B1 | * | 3/2014 | Lores | B60P 1/14 298/19 V |

* cited by examiner

*Primary Examiner* — Jonathan Snelting
(74) *Attorney, Agent, or Firm* — Erica A. Hinojosa (57) ABSTRACT

The present disclosure of the Improved Trailer Bed Load Plow concerns a highly customizable, legacy trailer compatible, removable, system for unloading trailer loads and/or flat bed loads. The system, generally speaking, comprises a sled, a plow, a controllable puller such as a winch, guide rails, detents, and an attachment point on the trailer. In some implementations, the plow and puller are attached to the sled, and the combined unit travels the length of the trailer bed, constrained by the guide rails to lateral travel, via the force created by the puller acting against the attachment point which is effectively positioned on an end of the trailer.

20 Claims, 10 Drawing Sheets

TRAILER BED MOUNTED LOAD PLOW SYSTEM

CROSS-REFERENCE TO RELATED APPLICATIONS

This application is a continuation in part and claims the benefit of nonprovisional patent application Ser. No. 16/024,330, filed on Jun. 29, 2018.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

Towed trailers provide a great way to move loads from one place to another. However, once the trailer has reached its destination, the load must be unloaded (removed) from the trailer. In some circumstances, the load may be fragile, delicate, easily damaged, and so on. Or perhaps the load is sensitive to tilting and handling. In those cases, manual labor is often the best solution to unload the load. However, there are many commercial, agricultural, and even residential uses of a trailer for loads that do not require any gentle handling. For example, loads comprising gravel, dirt, hay, barrels, stone, debris, branches, trash, etc. In these cases manual labor to remove the load from the trailer is not a good solution. It can be overly taxing on the health and physical condition of the laborer. It can be expensive in terms of cost and time. And having to enter the trailer to physically unload the load can also be dangerous.

Many trailer unloading methods and devices have been developed with the goal of improving the ability of a person to unload a trailer in a safer, faster, and reliable way. The prior art has not thoroughly addressed the problem. In many cases, the prior art has introduced new problems.

For example, many inventions have focused on unloading via raising one side of the trailer thereby causing the contents to shift towards the un-raised side. See U.S. Pat. Nos. 3,826,534 and 8,662,598 for two such means known as "dump trailers." These means must either be integrated into the trailer during fabrication or else require substantial and complicated retrofit modifications. In many cases, the expense is cost prohibitive. In other cases, a person has an existing trailer that cannot be modified in such a way. Another problem with prior art dump trailers is the inability to unload in height restricted areas. Another problem is the tipping hazard caused by raising potentially unbalanced loads. Another issue is that the mechanical components (pistons, motors, pulleys, hinges, etc.) may reduce the trailer capacity or else cause the trailer bed to be raised to accommodate the components. Another issue is the difficulty in replacing or repairing the components if there is a failure or break down. These are significant problems that have resulted in a low adoption and use rate by trailer owners and operators.

Others have used tarps or other trailer bed liners that are anchored to the ground before driving the trailer away which causes the load to be pulled out. This can be a time consuming effort to set up and keep in place while the load is being loaded. Furthermore, the anchor point on the ground is unreliable or simply not an option in many cases. Worse still is the lack of control and safety of these systems.

What is needed in the market is an alternative means of trailer unloading that can be readily installed on existing trailers without substantial modification. Even better would be a system that can be removed when it is not in use or desired. Better still would be a system that can be repaired or replaced without extensive knowledge of high powered components and hydraulic systems. And if the system did not have the inherent safety and function issues with lifting and tilting then that would be a truly useful and desired invention by many trailer owners.

BRIEF SUMMARY

The present disclosure of the Improved Trailer Bed Load Plow concerns a highly customizable, legacy-trailer or truck compatible, removable, system for unloading trailer loads and/or flat bed loads with control. The system, generally speaking, comprises a sled, a plow, a puller (such as a winch), guide rails, and an attachment point on the trailer. In some implementations, the plow and winch are attached to the sled, and the combined unit travels the length of the trailer bed, constrained by the guide rails to lateral travel, via the force created by the winch retracting the winch cable which is effectively attached to the opposite end of the trailer.

An objective of the present disclosure is to describe a system that is capable of adapting to a wide range of trailers and flat beds to which it is applied. It is a further objective of the disclosure that the system be capable of being removable from the trailer.

An objective of the present disclosure is to describe a system that is capable of assisting with loading loads into the trailer as well as unloading the loads. Generally speaking this is achieved by the detents that are engaged as desired to prevent sled movement, thus allowing the puller to draw the load into the truck or trailer bed.

DETAILED DESCRIPTION

In the paragraphs below, detailed descriptions of the various exemplifying implementations will be set out. Some of these implementations will correspond to one or more of the drawings (figures). Note that the drawings are meant to illustrate the relative arrangement of features in relation to one another and not necessarily the exact ratio of dimensions. There are many more implementations that do not have a corresponding drawing, both expressly described and implied in this disclosure. Furthermore, the implementations may be referred to as a "trailer bed mounted load plow system" but upon reading, it will be readily understood by one having ordinary skill in the art that the device can be used or adapted for use on a number of targets including flat bed trucks and the like. The naming should not be understood to limit the application of the various stated, implied, and otherwise disclosed implementations. Further note that certain direction or orientation informing adjectives and phrases such as top, bottom, rear most, and forward most will be used herein. In the context of this disclosure, bottom indicates the side or edge closest to the ground and top indicates the side or edge furthest from the ground. Thus top and bottom are the same whether discussing the unclaimed environmental structure (the trailer) or the claimed structure (the load plow system). However, in the context of this disclosure, rear most indicates the edge closest to the rear end of the trailer (the end opposite the hitch) when discussing the trailer only; the orientation descriptors are reversed for the load plow system which faces in the opposite direction compared to the trailer. Thus, when describing the load plow system, rear most refers to the side or edge furthest from the plow (closest to the front of the trailer).

In a basic implementation, the load plow system comprises a plow attached to a sled that is guided by guide rails that are attached to the trailer. The sled and plow move back and forth on the trailer by using a mechanical means to pull, a puller, against a fixed point on the trailer, an anchor point. Because the puller is mounted to the sled, the sled is pulled towards the fixed point on the trailer, thus moving the load in the same direction.

Figure 1:
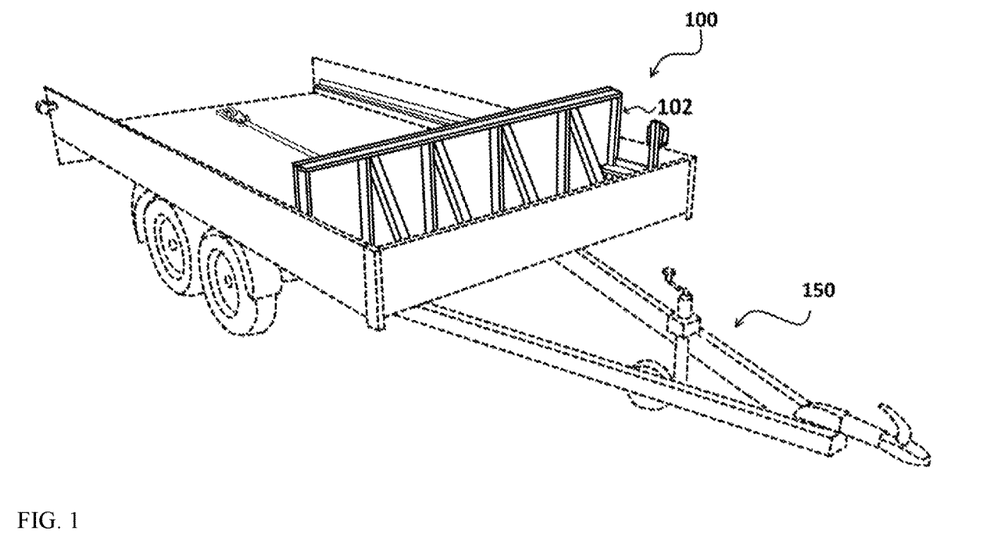
FIG. 1 shows a perspective view of the back of a basic implementation of the invention as positioned within a trailer at the forward most edge of the trailer's bed.
Figure 2:
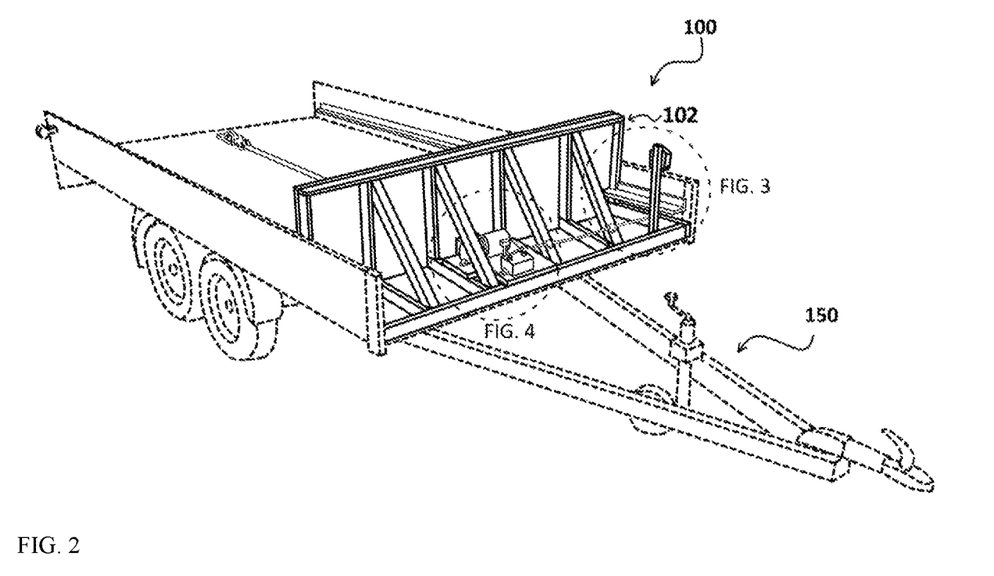
FIG. 2 shows the same perspective view of the back of the basic implementation shown in FIG. 1, but with the forward most wall of the trailer's bed removed to show the implementation's features more clearly.

FIG. 1 shows a first and basic implementation of the trailer bed mounted load plow system 100 positioned on a typical trailer 150. The load plow system 100 is positioned at the forward most edge of the trailer bed, but oriented contrary to the trailer 150 direction such that the front of the load plow system faces the rear of the trailer 150 and the back of the load plow system faces the front of the trailer 150. However, while FIG. 1 is important for understanding the position and orientation of the load plow system within the trailer 150, it is not particularly useful to understand the functional elements of the system itself. For a clearer understanding, see FIG. 2. FIG. 2 shows the same load plow system 100 on the same trailer 150 of FIG. 1 but with the forward most wall of the trailer bed removed.

The load plow system 100 comprises a sled 102, a plow 104, a winch 106, a controller 108, a battery 110, a support plate 112, a power cord 126, a controller cord 128, cord retainers 130, a controller mount 114, guide rails 116, guide grooves 118, a cable 120, a hook 122, and an anchor point 124. For reference, see FIG. 3 and FIG. 4 which show magnified partial perspective views focusing on the functional elements of the load plow system 100.

The guide rails 116 comprise at least two elongated members that are positioned along the trailer bed side walls. The guide rails 116 are attached to the trailer 150 using any of a multitude of acceptable means such as welding or flush sitting bolts with nuts. A preferred guide rail material of construction is angle metal (made of steel, iron, aluminum, etc.) of equal to or less than 2 inches width. However, other suitable materials of construction exist and would become known to one having ordinary skill in the art upon reading the present disclosure. For example another suitable material of construction is square tubing of similar width, or a simple wood beam. The use of the guide rails 116 is minimally intrusive to the trailer bed, but serves to guide the sled 102 and prevent the movement of the sled 102 in anything other than a forward and backward direction along the trailer bed. The guide rails have a topside and an underside that engage with the corresponding guide groove.

In some implementations (not shown in the drawings), there are two guide rails that engage each side of the sled. In those implementations, the top guide rail and the bottom guide rail form a channel that keeps the sled in the correct position relative to the trailer bed. In some related implementations the channel formed by the guide rail supports the weight of the sled at a particular distance away from the trailer bed so that the trailer bed is spared excessive wear and tear from the plow and sled scraping the surface of the trailer bed.

Figure 3:
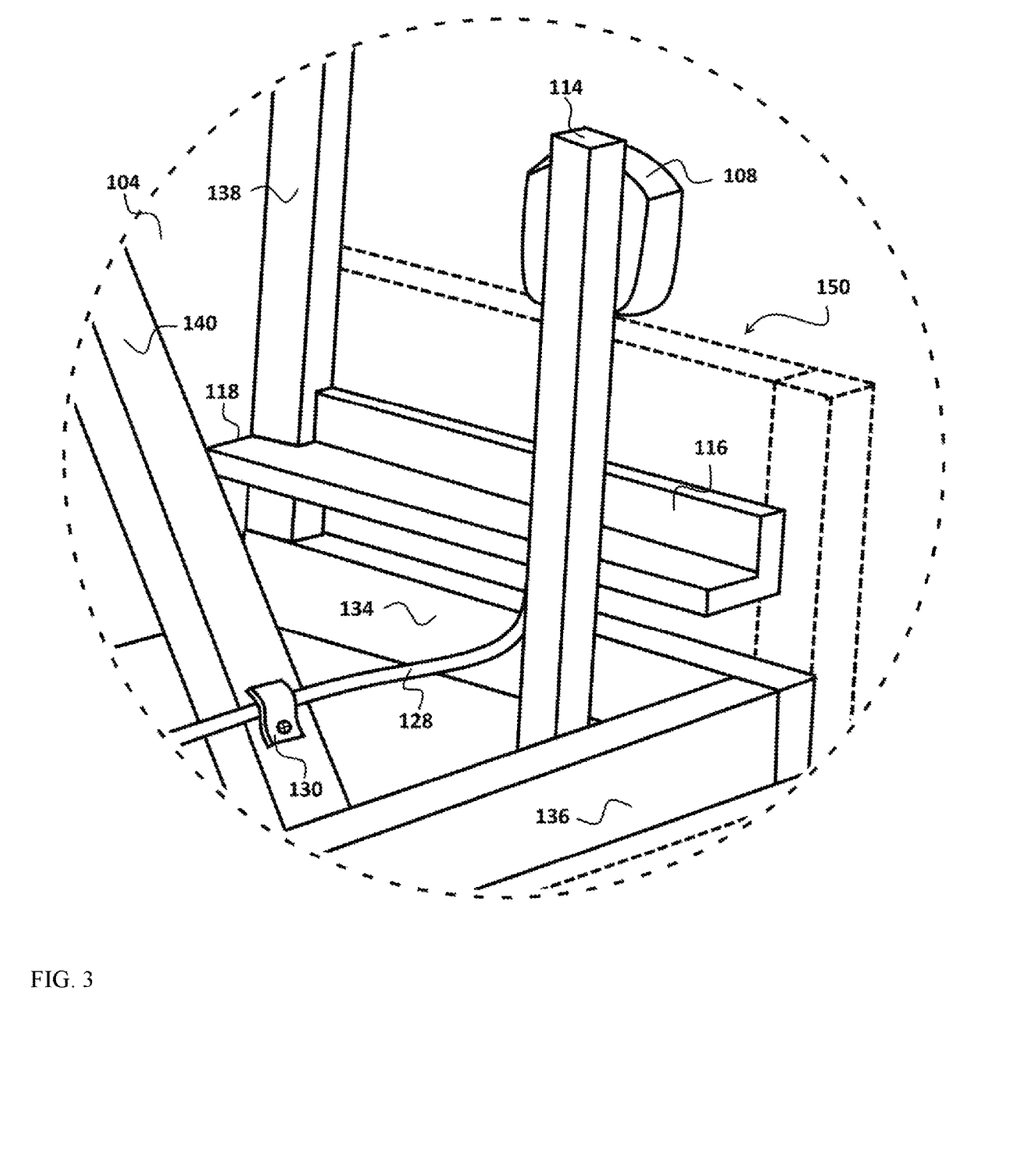
FIG. 3 shows an enlarged partial perspective view of the back of the basic implementation shown in FIG. 2, with the focus on the rail and controller.

Referring back to the implementation of FIG. 2, and better seen in FIG. 3, the guide rail 116 passes through guide groove 118. Critically, the guide groove 118 allows the sled and plow to be both under and above guide rail 116. The portion of guide groove 118 that engages with the underside of the guide rail 116 prevents vertical movement of the sled—where vertical is understood to be movement along the axis perpendicular to the plane of the trailer bed. This innovation keeps the sled and plow from lifting and crawling over a load, which may otherwise happen despite the weight of the sled due to the weight and friction of the load.

In some implementations, the guide rails further comprise position detents or locks. When engaged the position detents cause the sled to be fixed in position on the guide rail. This is useful to operators of the system that would like to prevent unintended movement of the sled. The user may want to prevent theft of the load plow system; or no movement during transit. Furthermore, the fixed position enables the puller (such as a winch) to be used to pull loads into the trailer bed, which no other system can accomplish. This is possible because the detents prevent the movement of the sled, so the puller can be attached to the load instead of the trailer, and the load will be pulled into the trailer bed. At that time, the puller can be detached from the load and attached to the trailer to be ready for load dumping.

Figure 9:
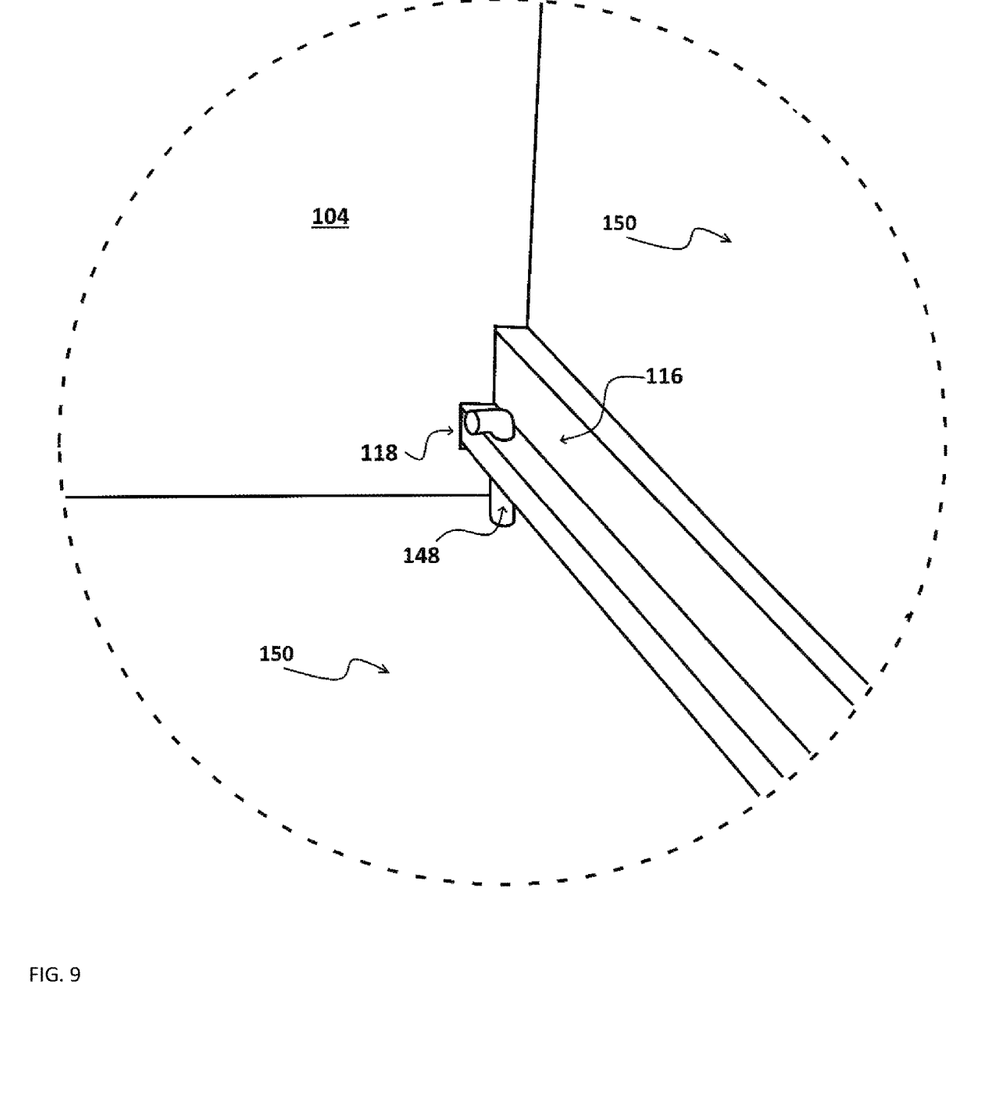
FIG. 9 shows an enlarged partial perspective view of the front of the basic implementation shown in FIG. 5, with the detent implemented as a hitch pin passing through a hole in the guide rail.

One particular implementation of the detent is a hitch pin inserted into a pin hole in the guide rail. See FIG. 5 and FIG.

Figure 5:
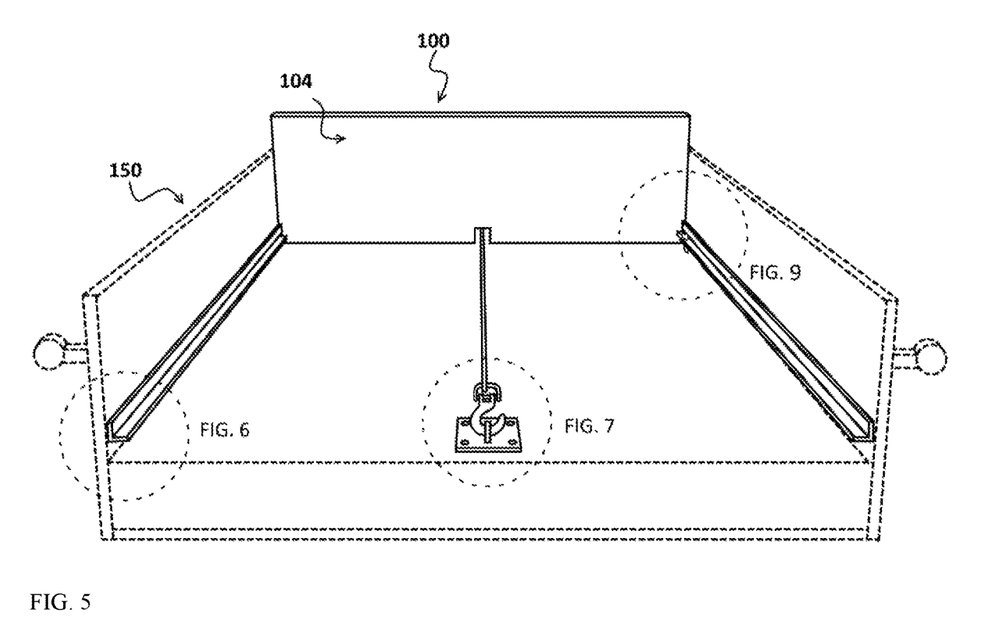
FIG. 5 shows a perspective view of the front of the implementation of FIG. 1, wherein the rear most edge of the trailer is in the foreground.

9 for detent 148 engaged on guide rail 116. Other related implementations include hitch pin locks, padlocks, combination locks, bolts, screws, and the like disposed in the pin hole instead of the hitch pin. The use of a locking pin or lock adds a security feature to prevent theft of the trailer mounted load plow system.

Other detent implementations include clamps that attach to the guide rail (such as a C-clamp). In some implementations, there is only one detent on one of the guide rails. In other implementations, there is one detent on each of the guide rails. In yet other implementations, there are more than one detent positions on each guide rail.

Figure 10:
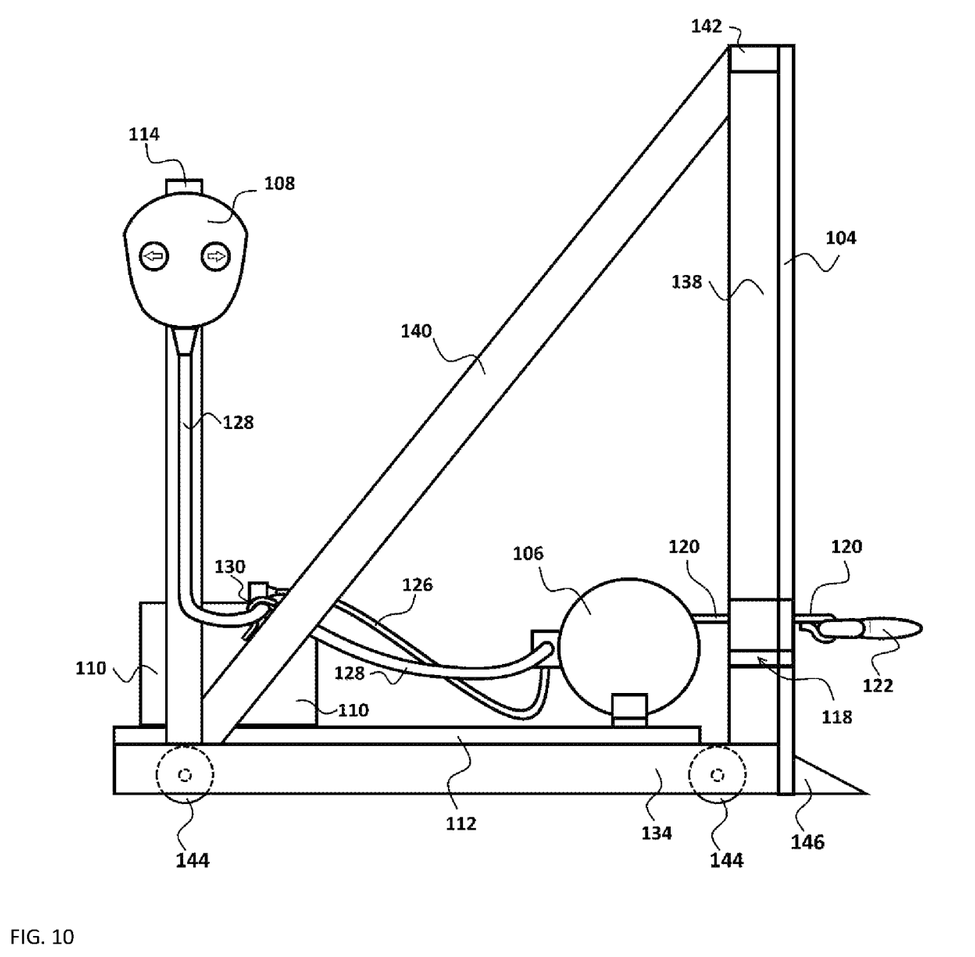
FIG. 10 shows an orthogonal view of the side of an implementation similar to that of FIG. 1, removed from the trailer and wherein the winch cable has been retracted, but with lip 146 positioned along the forward-facing bottom edge of the plow 104.

Further describing a sled of a basic implementation of the trailer mounted load plow system, the sled comprises at least two horizontally oriented sled skids, a back support member, at least two vertically oriented sled studs, at least two angled sled braces, and plow stiffeners. The sled is essentially the frame with which the various components of the system engage. In some implementations, the horizontally oriented sled skids are augmented with rollers for reducing the friction of the sled travel across the trailer bed. In a subset of those implementations, the rollers are wheels. See the wheels 144 attached to the sled skids 134 in FIG. 10. In some implementations the sled has rollers that engage each of the guide rails for smoother travel along the length of the trailer bed.

As shown in FIG. 2 the sled 102 of load plow system 100 comprises six sled skids 134 that are attached to the back support member 136 at the rear most end of the sled skids 134. The sled 102 further comprises one sled stud 138 attached to each of the six sled skids 134 at the forward most ends of the sled skids 134, such that the sled studs 138 are substantially perpendicular to the sled skids 134. The sled 102 of load plow 100 further comprises four angled sled braces 140. The four sled braces 140 are positioned such that one is connected to each of the interior four sled studs 138 top ends and each of the interior four sled skids 134 rear most ends. The sled braces 140 provide structural reinforcement to the sled 102.

Still referring to FIG. 2, the plow 104 of load plow system 100 is attached to each of the six sled studs 138 at the forward most edge of each. For further structural reinforcement, the plow 104 is reinforced with plow stiffeners 142 along the perimeter. While the plow 104 is substantially rectangular in shape, there are a few deviations. Among these the plow 104 comprises an opening 132 for the winch cable 120 to pass through, and guide grooves 118 that correspond to each guide rail (the left and right guide rail). The position of the opening and the guide grooves can be customized to the needs of the trailer to which it is adapted for use. However, there is a preferred implementation wherein the opening is formed along the bottom edge of the plow and centered midway (as seen in FIG. 2 and FIG. 5) for greater stability and optimal cable positioning. The width of the plow is adapted for the target trailer bed interior width. The height of the plow is also adapted for the trailer, though a preferred height is in the range of 1-5 ft, or at least as tall as the trailer bed walls.

Figure 11:
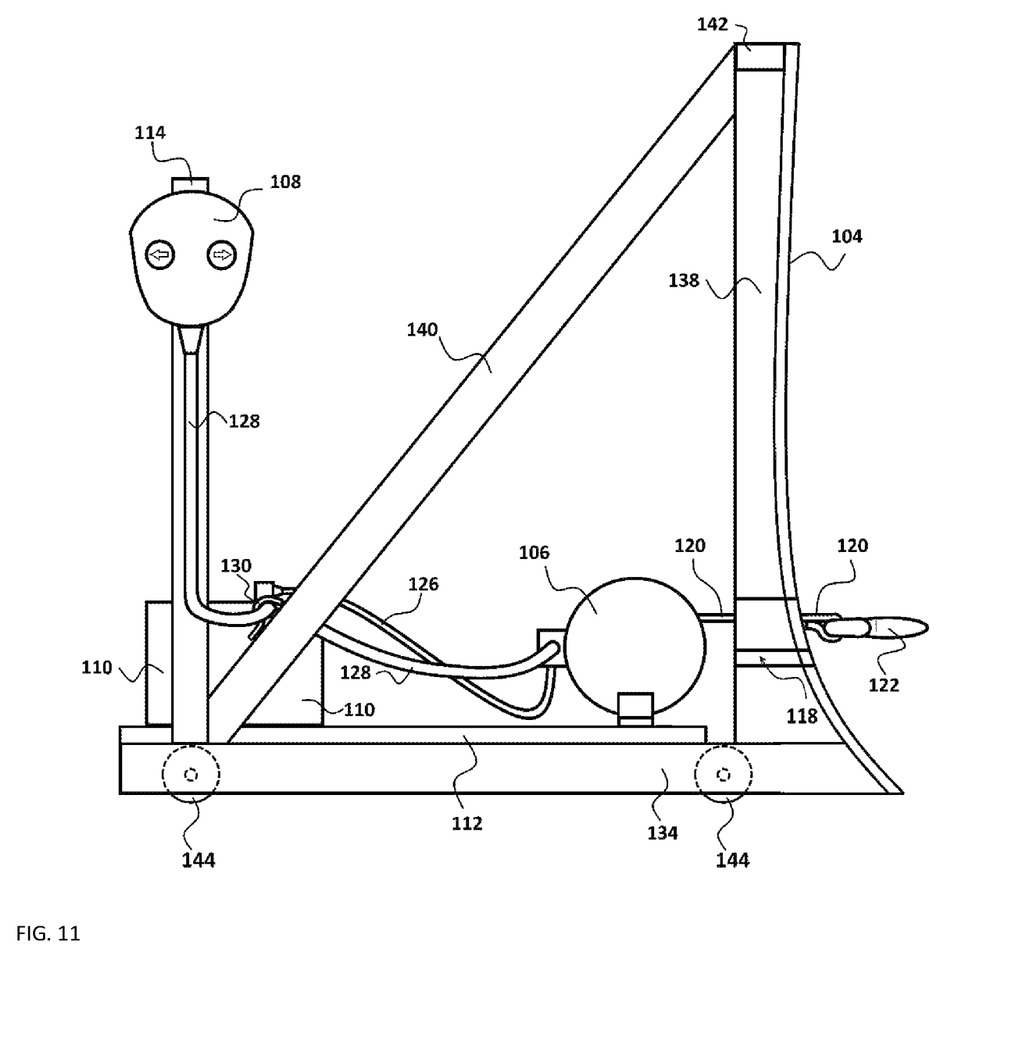
FIG. 11 shows an orthogonal view of the side of an implementation similar to that of FIG. 1, removed from the trailer and wherein the winch cable has been retracted, but with the plow 104 having a concave curvature.

In some implementations, the plow is further comprised of a lip that extends outward from the front facing side edges and bottom edge. The lip in some implementations is short and provides resistance to loads from slipping past the plow. In other implementations the lip is longer and provides greater resistance to loads from slipping past the plow. See the lip 146 attached to the plow 104 in FIG. 10. In some implementations, the plow has a concave curvature similar to a tractor scoop or bucket. See the concave curvature of plow 104 in FIG. 11. In some of those implementations, the plow has side walls that reinforce the curved plow face. In some implementations the plow is further comprised of short chisel tipped protrusions, or teeth, that are positioned along the bottom edge. In some implementations, the opening can be substantially closed via a panel that still allows the cable to travel through unimpeded. In a subset of those implementations, the panel is hinged. In another subset of those implementations, the panel slides into position. In another subset the panel can be secured into position via a latch. In some implementations, the plow is modular, allowing the user to add or remove sections as needed. For example, in some implementations, the plow has a first plow section that is further comprised of slots that are engaged by the corresponding slot engagement members on a second plow section. Thus the height of the plow can be adjusted for the need.

Turning now to FIG. 3, load plow system 100 has a controller 108 attached to a controller mount 114. The controller 108 is the device that allows the user to operate the winch 106. The controller cord 128 connects the controller 108 to the winch 106. In some implementations, such as seen in FIG. 3, the controller cord 128 can be secured to the sled 102 via cord retainers 130. By positioning the controller mount 114 and controller 108 towards the driver's side edge (the left side) of the sled 102, the controller 108 will be readily accessible to the user. The user can safely operate the load plow system while walking along the outside of the trailer 150 without needing to enter the trailer bed area. FIG. 3 also shows the guide rail passing through the guide groove in the sled 102 and plow 104 of load plow system 100.

In some implementations, the controller is not wired to the winch via a controller cord (such as is the case with load plow system 100), but instead the controller is wireless thus allowing the remote control of the load plow system.

Figure 4:
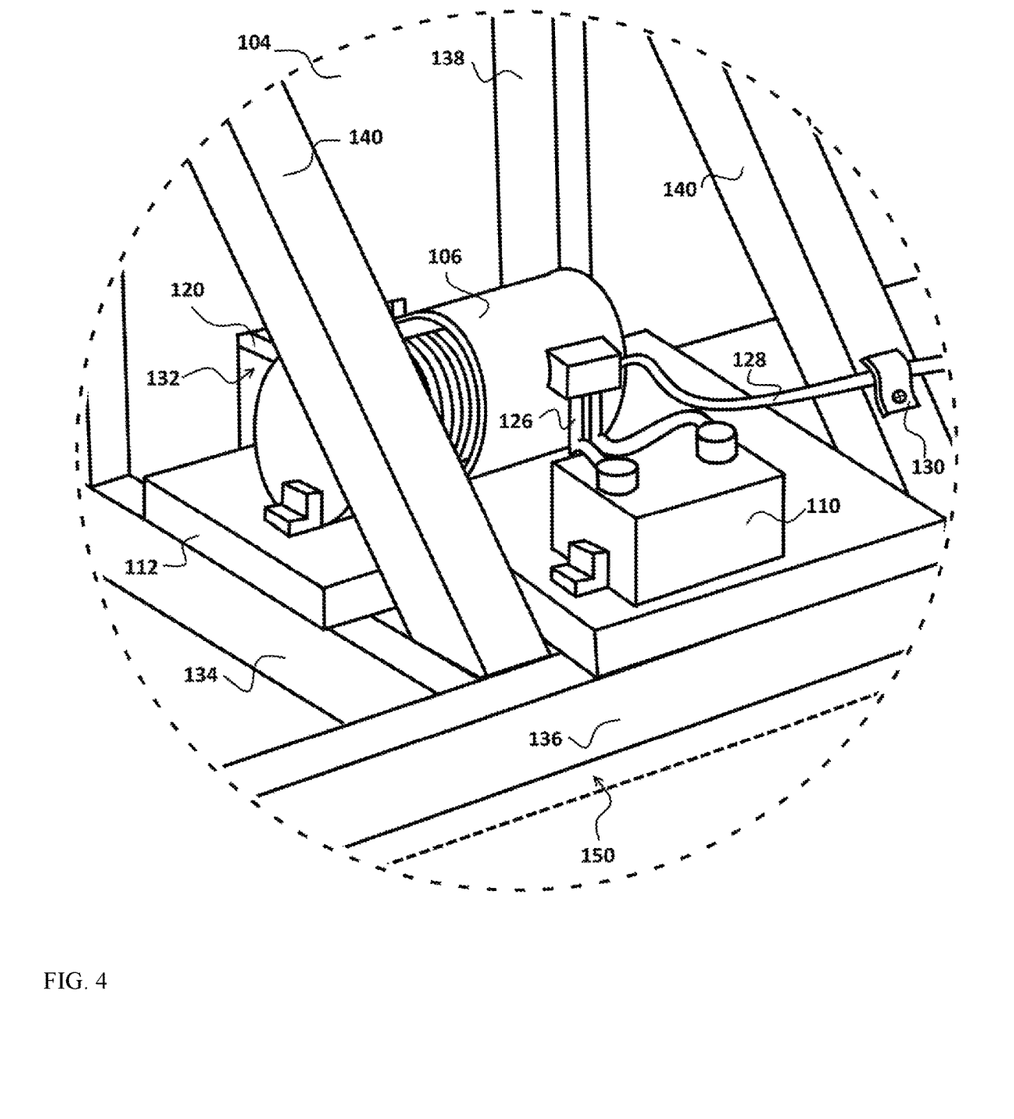
FIG. 4 shows an enlarged partial perspective view of the back of the basic implementation shown in FIG. 2, with the focus on the winch, battery, power cables, and controller cable on the support plate mounted on the sled.

Now referencing FIG. 4, load plow system 100 has a winch 106 and a battery 110 attached to a support plate 112 that is attached to the sled 102. While FIG. 4 shows the support plate 112 attached to the sled skids 134, in other implementations, the support plate 112 is attached to the sled studs 138, sled braces 140, or some combination of those structures. The battery 110 is connected to the winch 106 via a power cord 126. Alternative power sources are used for other implementations. For example, in some implementations, the power is supplied by the towing vehicle. Additionally, in some implementations, a solar panel mounted to the sled and connected to the battery. The solar panel is used to provide a means of regenerating the electro-chemical potential energy stored in the battery between uses. The winch 106 is positioned so that the cable 120 freely passes through the opening 132 in the plow 104.

Figure 6:
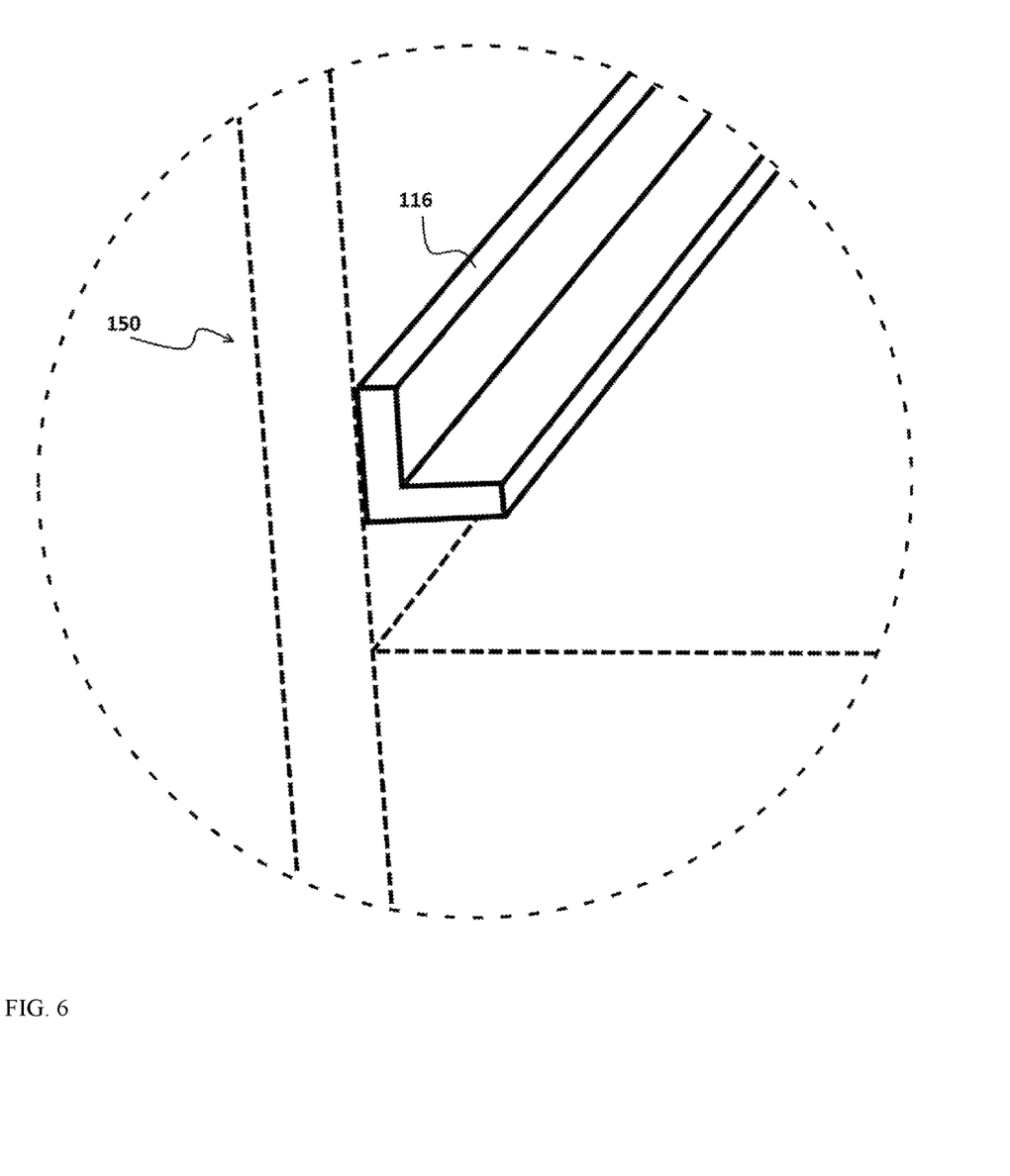
FIG. 6 shows an enlarged partial perspective view of the front of the basic implementation shown in FIG. 5, with the focus on the rail.
Figure 7:
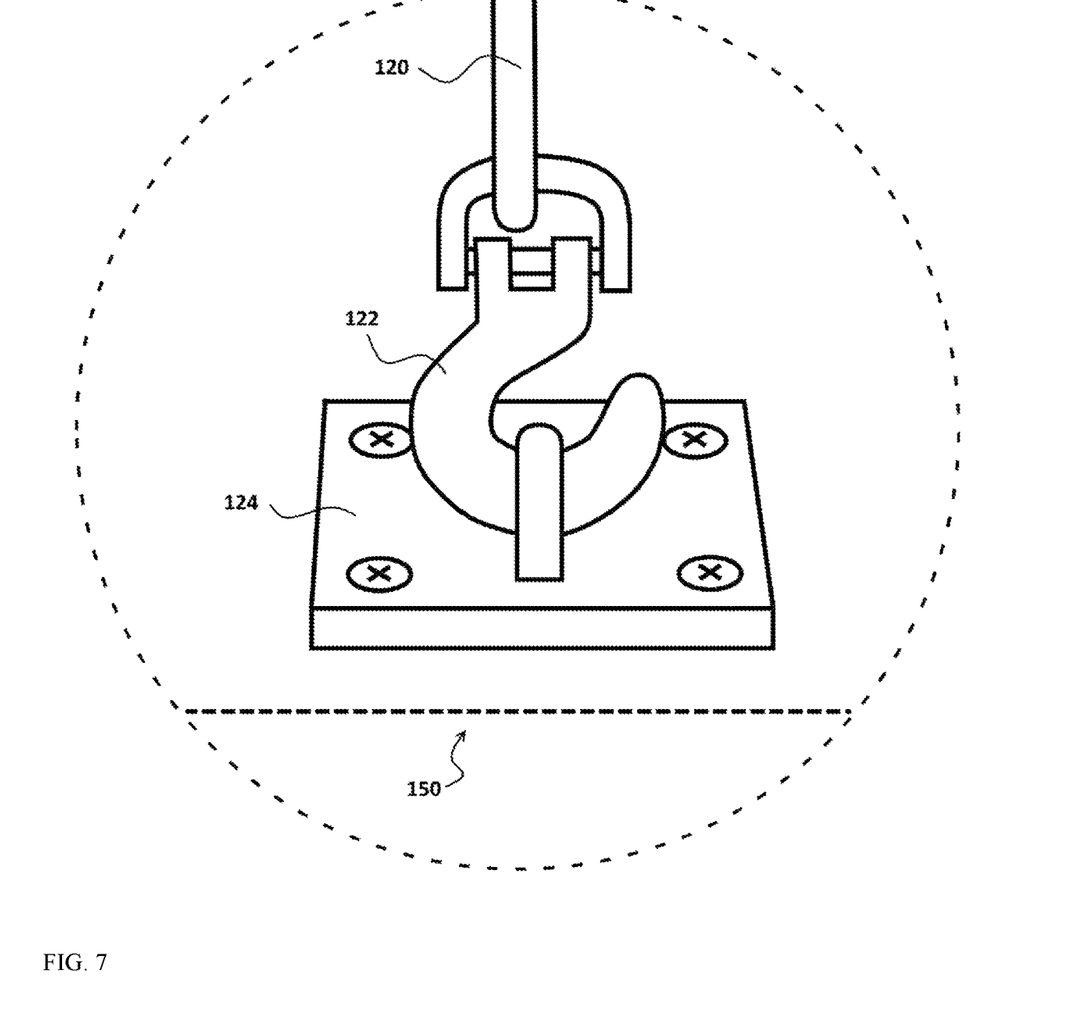
FIG. 7 shows an enlarged partial perspective view of the front of the basic implementation shown in FIG. 5, with the focus on the hook, cable, and anchor point.

In FIG. 5, the load plow system 100 is seen from the view of the rear of the trailer 150. In this figure, the load plow system is positioned at the front end of the trailer 150. FIG. 6 shows an enlarged view of the guide rail as attached to the interior of the trailer bed side wall. FIG. 7 shows an enlarged view of the winch cable 120, hook 122, and anchor point 124. The anchor point 124 shown in FIGS. 1, 2, 5, and 7 comprises an anchor plate with a protruding loop that has been attached to the trailer 150 near the center of the rear edge of the trailer bed. However, it will be understood by those having ordinary skill in the art that the winch may not have a hook, but rather some other connection mechanism, referred to as a connector. Furthermore they will understand upon reading the present disclosure that the addition of an anchor point may not be necessary as many trailers already have a suitable point of attachment for the cable at or near the center of the rear of the trailer. For example, a rear bumper, or a stiff edge of suitable strength may be used in some implementations as the point of attachment for the cable. Alternatively, a hitch receiver may be attached to the trailer back end so that a removable hitch may be connected when desired; wherein the removable hitch has an anchor point for use with the load plow system. The advantage of implementations with this removable anchor point hitch is that it will prevent the edge of the back end of the trailer from causing damage to the cable of the winch. Regardless of the implementation differences, the winch (or similar functioning structure) will pull against the stationary anchor point, thus pulling the sled across the trailer bed thereby causing the plow to engage with and push the contents of the trailer out of the open back end of the trailer.

Figure 8:
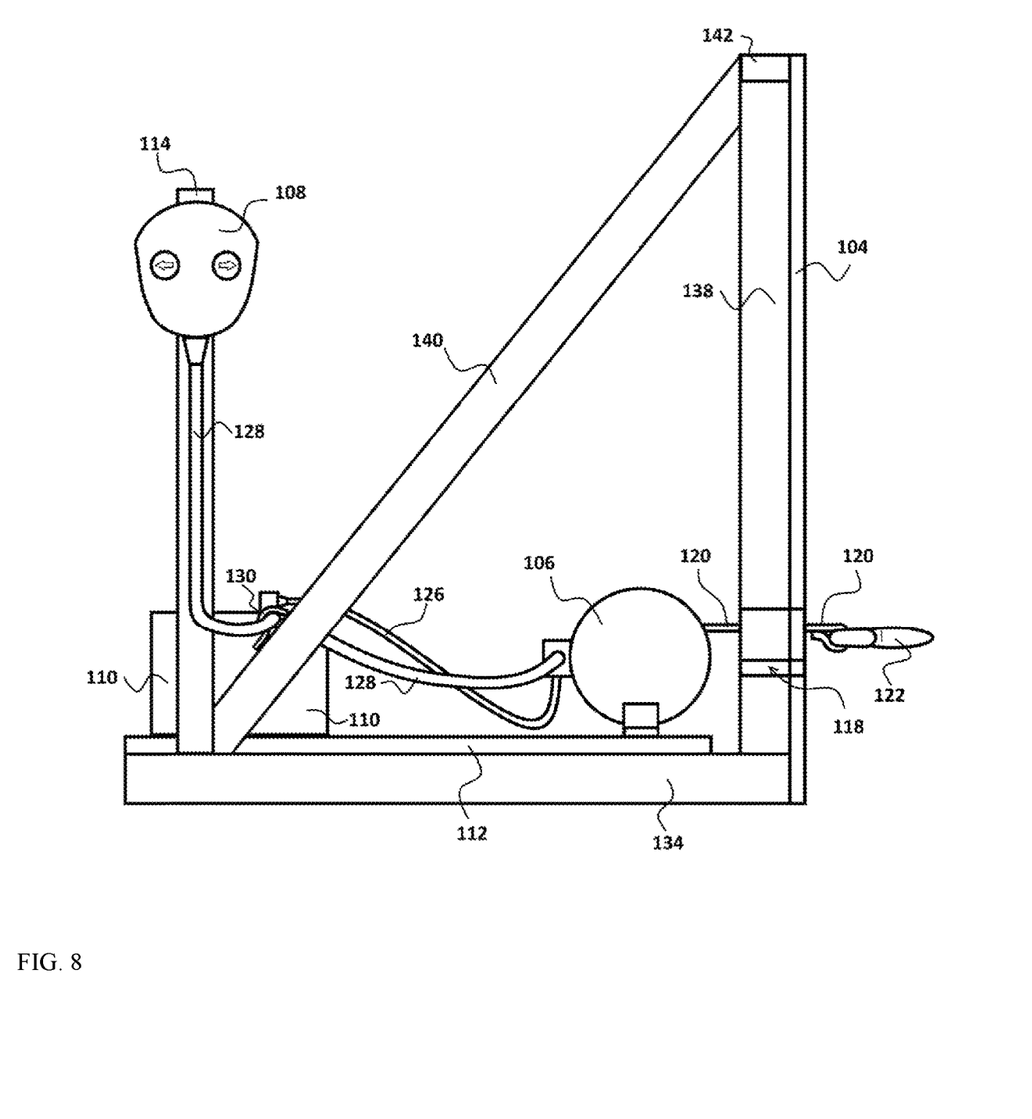
FIG. 8 shows an orthogonal view of the side of the implementation of FIG. 1, removed from the trailer and wherein the winch cable has been retracted.

For further clarification and detail of load plow system 100, see FIG. 8, which shows the side view of the same basic implementation discussed above. Note that this view excludes the trailer 150. Additionally, note that the cable 120 has been largely retracted into the winch 106. In this view, the controller 108 buttons are seen as circles with arrows indicating direction of winch cable travel.

In some implementations, system can be pulled in both directions (forwards and backwards) and not simply towards the rear of the trailer. In a subset of those implementations, the cable and hook are passed back through the opening in the plow and then attached to a second anchor point that is positioned near the center of the trailer bed's front wall edge. Then the cable is retracted causing the sled to be pulled back into the ready position at the front of the trailer bed. The cable and hook are disconnected from the second anchor point and then passed back through the opening in the plow to return the plow to the ready state.

Thus far, only implementations using a single winch have been discussed. However, there are other suitable means such as an electric or manually operated hoist. Furthermore, in other implementations, there is more than one winch. In some implementations, there are two winches that are simultaneously operated to increase the performance of the system since the work load is distributed across the two winches. In a subset of those implementations, the winches are both co-located centrally on the sled and the cable and hook of each passes through the same opening. In another subset of those implementations, the winches are not co-located on the sled, and each requires a separate opening and separate anchor point.

In some implementations, the load plow system further comprises a means for reduced friction, a friction reducer. In some implementations, the friction reducer is grease applied to the guide rails and skids. Other means for reducing the friction will be understood upon reading the present disclosure by those having ordinary skill in the art.

Although the invention has been described and illustrated with a certain degree of detail or with reference to one or more particular implementations, it is understood that the present disclosures have been made only by way of example. It should be understood that the invention is not intended to be limited to the particular forms disclosed. Furthermore, the invention is amenable to various modifications and alternative forms. Upon reading the present disclosure, it will be understood by those having ordinary skill in the art that many other implementations are disclosed herein whether expressly or by implication. Obvious variations and other various changes in the composition, combination, and arrangement of parts can be utilized to by those skilled in the art without departing from the spirit and scope of the invention, as herein disclosed and claimed.

The invention claimed is:

1. A load plow system for a trailer wherein the trailer has a bed comprised of a front end, a back end, a left side wall, and a right side wall, where the left side wall and the right side wall are substantially parallel, opposing, and run from the front end to the back end of the trailer bed, comprising:
   a plow;
   a sled, upon which the plow is mounted, having a right guide rail groove and a left guide rail groove;
   a left guide rail, attached to the left side wall of the trailer bed, wherein the left guide rail has a left guide rail underside and a left guide rail topside that correspond to and engage with the left guide rail groove on the sled such that the movement of the sled is restricted to moving along the trailer bed between the front end and back end of the trailer while preventing the sled from lifting away from the trailer bed;
   a right guide rail, attached to the right side wall of the trailer bed, wherein the right guide rail has a right guide rail underside and a right guide rail topside that correspond to and engage with the right guide rail groove on the sled such that the movement of the sled is restricted to moving along the trailer bed between the front end and back end of the trailer while preventing the sled from lifting away from the trailer bed;
   a puller, mounted to the sled;
   an anchor point on the trailer, to which the puller can be connected;
   an opening in the plow aligned with the puller such that the puller can pass through the opening in the plow and connect to the anchor point; and
   a controller, that controls the puller.

2. The load plow system of claim 1 wherein the puller comprises a winch, further wherein the winch comprises a cable having a terminal end and a connector positioned at the terminal end of the cable.

3. The load plow system of claim 2 wherein the winch further comprises a motor, and further wherein the winch is powered by a battery.

4. The load plow system of claim 1 wherein the anchor point on the trailer comprises a plate with a protruding loop that is mounted to the trailer.

5. The load plow system of claim 1 wherein the anchor point on the trailer comprises an existing connection point on the trailer.

6. The load plow system of claim 1 further comprising a right sled detent that engages the right guide rail and a left sled detent that engages the left guide rail.

7. The load plow system of claim 6 wherein the sled detent is comprising a left pin hole formed in the left guide rail, a left hitch pin, a right pin hole formed in the right guide rail, and a right hitch pin, such that the left hitch pin can be inserted into the left pin hole and the right hitch pin can be inserted into the right pin hole to prevent sled movement along the left guide rail and right guide rail.

8. The load plow system of claim 1 wherein the sled further comprises a frame having:
   at least two horizontally oriented skids, each with a skid front end and a skid back end positioned on opposite distal ends;
   a support member connecting each of the at least two skid back ends;
   at least two vertically oriented studs, each with a stud bottom end and a stud top end positioned on opposite distal ends, where there is at least one stud bottom end connected to each of the at least two skid front ends; and at least two angled braces connecting each of the skid back ends to each of the corresponding stud top ends.

9. The load plow system of claim 1 wherein the sled further comprises a support plate mounted to the sled upon which the puller is mounted.

10. The load plow system of claim 1 wherein the sled further comprises rollers that engage the bed of the trailer.

11. The load plow system of claim 1 wherein the sled further comprises rollers that engage the left guide rail and right guide rail.

12. The load plow system of claim 1 wherein the plow further comprises a panel adapted to substantially close the opening in the plow, while still allowing the puller to partially pass through and connect with the anchor point.

13. The load plow system of claim 1 wherein the plow further comprises stiffeners attached to the plow that are also connected to the sled.

14. The load plow system of claim 1 wherein the plow has a perimeter and a front face oriented away from the sled, and further wherein the plow comprises an outwardly extending lip on the front face that is positioned along the perimeter.

15. The load plow system of claim 1 wherein the plow further comprises reversibly removable modular sections that can be added or removed to modify a height of the plow.

16. The load plow system of claim 1 wherein the controller is mounted on a controller mount that is positioned near a side edge of the sled.

17. The load plow system of claim 1 wherein the plow further comprises a concave curvature reinforced with a left side wall and a right side wall.

18. A load plow system for a trailer wherein the trailer has a bed comprised of a front end, a back end, a left side wall, and a right side wall, where the left side wall and the right side wall are substantially parallel, opposing, and run from the front end to the back end of the trailer bed comprising:

a plow, having an opening, where the plow is reinforced with stiffeners;

a sled, upon which the plow is mounted, the sled further comprising:

a support plate, a right guide rail groove, a left guide rail groove, at least two horizontally oriented skids, each with a skid front end and a skid back end positioned on opposite distal ends, a support member connecting each of the at least two skid back ends, at least two vertically oriented studs, each with a stud bottom end and a stud top end positioned on opposite distal ends, where there is at least one stud bottom end connected to each of the at least two skid front ends, and at least two angled braces connecting each of the skid back ends to each of the corresponding stud top ends;

a left guide rail, attached to the left side wall of the trailer bed, wherein the left guide rail has a left guide rail underside and a left guide rail topside that correspond to and engage with the left guide rail groove on the sled such that the movement of the sled is restricted to moving along the trailer bed between the front end and back end of the trailer while preventing the sled from lifting away from the trailer bed;

a right guide rail, attached to the right side wall of the trailer bed, wherein the right guide rail has a right guide rail underside and a right guide rail topside that correspond to and engage with the right guide rail groove on the sled such that the movement of the sled is restricted to moving along the trailer bed between the front end and back end of the trailer while preventing the sled from lifting away from the trailer bed;

a right sled detent that engages the right guide rail and a left sled detent that engages the left guide rail;

a puller comprising a motor driven electric cable winch, mounted to the support plate on the sled, and wherein a cable of the cable winch passes through the opening in the plow;

an anchor point on the trailer, to which the puller can be connected, that is selected from the group consisting of an existing connection point on the trailer, a plate with a protruding loop that is mounted to the trailer, and a removable anchor point hitch that is mounted to the trailer;

a controller, that is connected to the motor driven electric cable winch, that controls the puller, where the controller is mounted on a controller mount that is positioned near a side edge of the sled; and a battery that is connected to the motor driven electric cable winch via a power cord.

19. The load plow system of claim 18 wherein the plow has a perimeter and a front face oriented away from the sled, and further wherein the plow comprises an outwardly extending lip on the front face that is positioned along the perimeter.

20. The load plow system of claim 18 wherein the plow further comprises a concave curvature reinforced with a left side wall and a right side wall.

* * * * *